E. P. DARGIN.
FILTERING APPARATUS.
APPLICATION FILED SEPT. 14, 1907.
959,844.
Patented May 31, 1910.
2 SHEETS—SHEET 1.
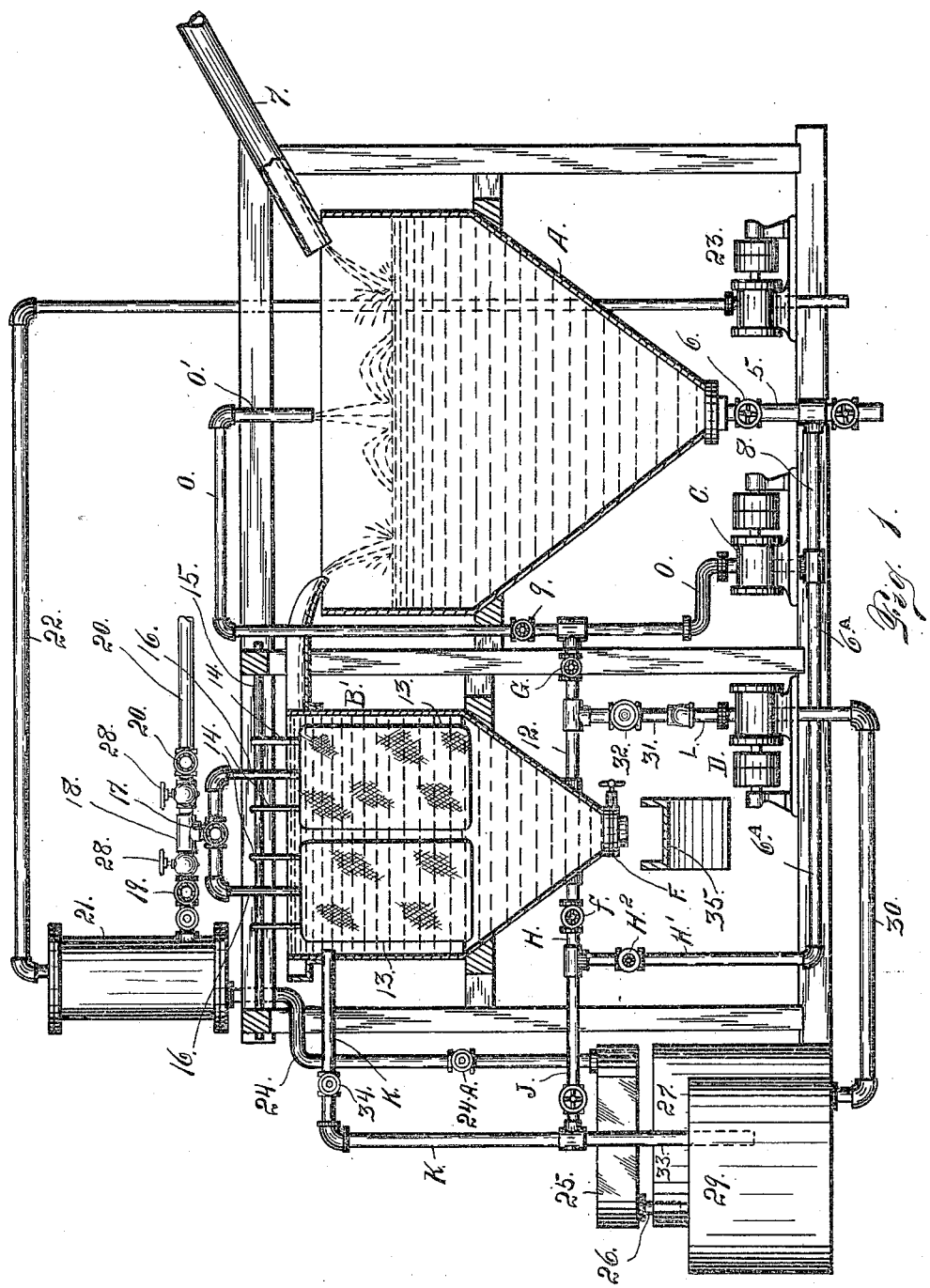
Witnesses
Otto E. Hoddick.
Dena Nelson.
Inventor
E. P. Dargin.
By
Attorney

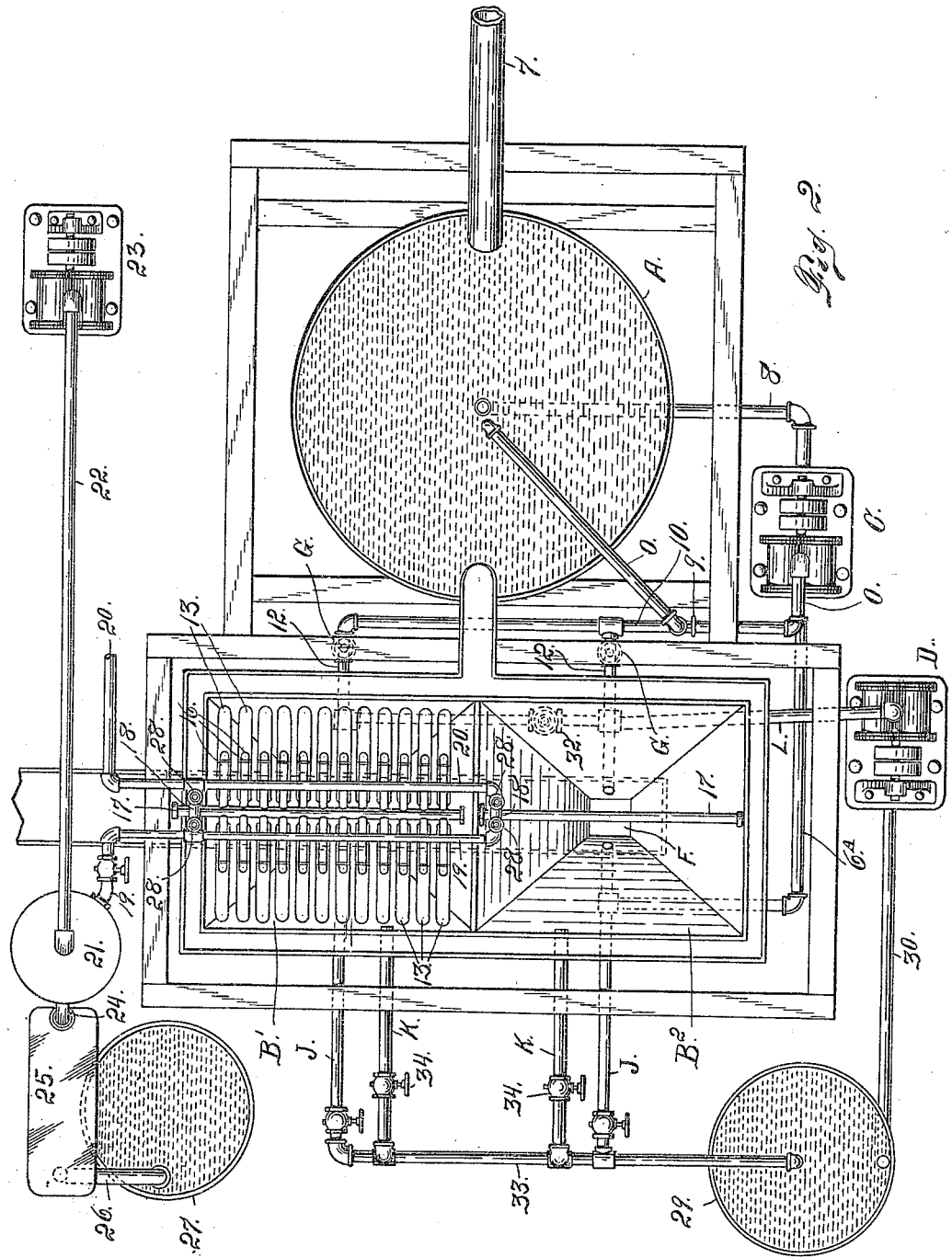

UNITED STATES PATENT OFFICE.

ERNEST P. DARGIN, OF DENVER, COLORADO, ASSIGNOR TO MARY E. DARGIN, OF DENVER, COLORADO.

FILTERING APPARATUS.

959,844.  Specification of Letters Patent.  Patented May 31, 1910.

Application filed September 14, 1907. Serial No. 392,888.

*To all whom it may concern:*

Be it known that I, ERNEST P. DARGIN, a citizen of the United States, residing at the city and county of Denver and State of Colorado, have invented certain new and useful Improvements in Filtering Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in filtering apparatus more especially adapted for use in connection with the saving of the precious metal values by what is ordinarily known as the cyanid process. The apparatus involves the use of filter tanks, a slime tank, means for circulating the pulp containing the values to be saved, from the slime tank to the filter tanks, there always being a surplus to overflow back into the slime tank, whereby a circulation may be constantly maintained simultaneously with the withdrawal of the cyanid solution from the filter tank through the agency of suction. In other words the pump employed for passing the liquid slimes from the slime tank to the filter tank, is capable of handling the liquid slimes much faster than the slimes are supplied to the said tank, consequently provision may be made for an overflow from the filter tank to the slime tank, the said overflow being the surplus not taken out of the filter tanks through the instrumentality of the exhaust mechanism. Means are also employed for cleaning the slime tanks in which filter bags are located, by the introduction of wash water into the tank simultaneously with the use of suction in connection with the filter bags, whereby the solid slimes collected exteriorly on the bags are washed and deprived of any valuable solution which may adhere thereto. Provision is also made for an overflow during such cleaning operation, into a wash water tank. I also employ means for drawing off the wash water from the filter tanks, whereby the filter bags are left suspended with the solid slimes adhering to their external surfaces; and also means for introducing air or water into said bags for the purpose of disengaging the coating of slimes and causing the same to drop downwardly into the tank whence it may be sluiced out by the introduction of water in a manner that will be readily understood.

Having briefly outlined my improved construction, I will proceed to describe the same in detail reference being made to the accompanying drawing in which is illustrated an embodiment thereof.

In this drawing, Figure 1 is an elevation of my improved apparatus with the slime tank and filter tank shown in section. Fig. 2 is a top plan view of the same showing two filtering compartments in one of which the filter bags are located while in the other the said bags are removed to better illustrate the other mechanism.

The same reference characters indicate the same parts in both views.

Let A designate a slime tank which is preferably provided with a cone-shaped bottom which terminates in a discharge pipe 5 provided with a valve 6. This slime tank receives its slimes in the form of pulp from a conduit 7 leading from storage tanks or directly from the mill as may be desired. From the pipe 5 a conduit 8 leads from a centrifugal slime pump C provided with a discharge pipe O which extends upwardly and is arranged to discharge into the slime tank through a depending member O' if desired. In this manner the slime solutions within the tank A may be agitated. It is rarely necessary, however, to resort to this method of agitation. The pipe O is provided with a valve 9 which may be closed to prevent the passage of the slimes into the upper part of the pipe O and thence into the slime tank when desired. From the pipe O leads a horizontally disposed pipe 10 having branches 12 leading to the filter tanks B' and B², respectively. Each of these pipes 12 is provided with a valve G for the purpose or regulating the passage of liquid therethrough.

Each of the filter tanks B' and B², contains a series of suspended filter bags 13 composed of a suitable filtering medium and with which depending supports 14 are connected at one extremity, while their upper extremities are supported by a stationary horizontal bar 15. With each filter bag is connected a pipe 16 leading to a central pipe 17 which is connected at one extremity as shown at 18 with two parallel pipes 19 and 20. The pipe 19 communicates with an air chamber 21 from which leads a pipe 22 to the exhaust pump 23. From the bottom of the air chamber 21 leads a pipe 24 to a zinc box 25 provided with an outlet 26 arranged to discharge into a sump tank 27. The pipe 20 as well as the pipe 19, is provided with a cut off valve 28, whereby communication between the filter bags and either of said conduits may be cut off at will. The pipe 20 is used to supply water or air under pressure to the filter bags for the purpose of removing the coating of slimes from their exterior surfaces. The pipe 20 may be connected with any suitable source of air or water under pressure.

Water or chemical solution from a tank 29 may be supplied to the filter tanks through the agency of a pump D. For this purpose a pipe 30 leads from the tank 29 to the pump D, while a pipe L leads from the pump D below the filter tanks and is connected with the pipes 12 by vertically disposed pipes 31, each of which is provided with a valve 32 for cut off purposes. Now provision is made for an overflow from the filter tanks during the introduction of water or cyanid solution, back to the tank 29 by pipes K which are elbow-shaped and are connected with a pipe 33 leading directly to the tank 29. Each of the pipes K is provided with a cut off valve 34.

After the filter bags have received all the slimes they can hold, provision is made for drawing off the slimes from the filter tanks through pipes H and H', the latter being connected with the suction pipe 6ᴬ of the slime pump C. After the slimes collected by the filter bags have been completely washed preparatory to their removal from the bags, the water or solution within the filter tanks may be drawn off through the pipes H and J, the latter being connected with the pipe 33 communicating with the tank 29. In this event a valve f in pipe H is opened and a valve H² in pipe H' closed.

The bottom of each filter tank is provided with a door or gate F which may be opened for the purpose of removing the slimes which have been disengaged from the exterior surfaces of the filter bags. These slimes will fall into a trough or launder 35 by which they may be conducted to any desired point.

From the foregoing description the use and operation of my improved filtering apparatus will be readily understood. Assuming that the entire apparatus is assembled as illustrated in the drawings, and that the tank A has a suitable quantity of slime solution and is continually receiving such solution from a source of supply, the operation of the apparatus is as follows: The valve 6 in the discharge pipe 5 must of course be open to allow the solution to pass through the pipe 8 to the pump C. Assuming that this pump C is in motion, the slime solution may be pumped from the tank A directly into the same tank through the pipe O for purposes of agitation if desired. The general operation of the apparatus, however, is to pass the solution from the pump C beyond the pipe O, through a pipe 10 (see Fig. 2) and thence through pipes 12 to the filter tanks B' and B². In this event the valve 9 in the slime pipe O is closed. It must be assumed that the filter tanks B' and B² contain the proper quantity of cyanid or other solution for the purpose of dissolving the precious metal values contained in the slime solution. The capacity of the pump being much greater than the discharge into the tank A from the conduit 7, causes a constant overflow from the filter tanks back into the tank A for purposes of agitation, simultaneously with the removal of the precious metal solution through the instrumentality of the suction apparatus with which the exhaust pump 23 is connected. Assuming that this exhaust pump is set in motion, the suction or vacuum pull upon the air tank 21 is sufficient to draw the solutions from the filter bags, whereby the air chamber 21 is caused to contain a quantity of solution in its lower portion. In starting the apparatus a valve 24ᴬ in the pipe 24 which leads from the air chamber 21, should be closed. However, after a quantity of solution has accumulated in the bottom of the air chamber 21, whereby the outlet passage 24 is sealed, the valve 24ᴬ is opened, after which the solution is virtually siphoned into the zinc box 25 and after being deprived of a considerable portion of its metallic values, is discharged through the outlet 26 into the sump tank 27.

During the operation of withdrawing the precious metal solutions from the inside of the filter bags, the solid slimes are caused to adhere to the exterior surface of the bags and as the operation is continued this accumulation increases in thickness until it becomes so thick that the operation is no longer practicable, since the vacuum pull is not sufficient to cause the precious metal solutions to pass through a thick coating of solid slime. In operating my apparatus, I usually employ a number of distinct filter tanks or compartments as B', B² so that while cleaning one of the tanks one or more other tanks may be in operation.

Now assuming that it is desired to clean one of the filter tanks, the valve G controlling the pipe 12 leading to that tank, is closed thus cutting off the passage of the slime solution to the filtering tank or compartment in question. When valve G is closed, valve f in pipe H is opened, whereby the solution is allowed to pass through the suction pipe H' to the slime pump C, through whose agency the solution removed from the one filtering tank or compartment may be delivered to the other filtering tank or compartment. After this is done the valve F is closed and the valve 32 in pipe 31 opened, whereby chemical solutions, water or both are forced by the pump D into the filter tank to be cleaned, whereby any excessive solution not removed through the filter bags, is caused to escape through the overflow pipes K to the tank 29. The slimes adhering to the filter bags are then ready to be removed or expelled, and the solution within the filter tank is drawn off into the tank 29 through the pipes H and J, the valve $f$ being opened and the valve $H^2$ closed. During the time of introducing the liquid through the agency of the pump D, the exhaust pump 23 is in operation and the solutions are constantly withdrawn from the filter bags through the agency of the suction mechanism as heretofore explained. Now, however, when it is desired to remove the slimes which have accumulated on the exterior surface of the filter bags, and after the solution has been withdrawn from the filter tank or compartment to be cleaned, the exhaust pump is shut down and air, water or both are forced by gravity or otherwise through the pipe 20, into the filter bags through the pipes 16, the valve 28 on the side of the air chamber being closed. The introduction of the fluid into the filter bags, dislodges the solid slimes from their exterior surfaces, which slimes are then sluiced out through the door F in the bottom of the tank or compartment. After the filter bags are cleaned of slime, the door F is closed and the filter tank which has been cleaned is ready to receive slime solutions, during which time the other filter tank may be washed and cleaned if desired, thus making a continuous process of agitation, aeration and filtration.

Having thus described my invention, what I claim is:

1. The combination of a filter tank, a slime-solution tank, means for passing the slime solutions from the last named tank into the lower portion of the filter tank, the said means having a capacity for introducing the slime solutions into the filter tank faster than the supply to the slime tank, means for withdrawing the metal solution from the filter tank, the said means having a less capacity than the means for introducing the slime solution to the filter tank, and means for permitting an overflow of the surplus from the filter tank to the slime-solution tank whereby the solution in both tanks is kept in a continual state of agitation.

2. The combination of a filter tank provided with filter bags suspended therein, a slime tank, means for removing the slime solution from the last named tank and introducing the same into the filter tank, suction mechanism connected with the filter bags for removing the metal solutions from the tank through the said bags, the means for supplying slime solution to the filter tank having a greater capacity than the means for removing the metal solutions from the filter tank, and means for permitting an overflow of the surplus from the filter tank to the slime tank, whereby the solutions in both tanks are kept in a continual state of agitation, substantially as described.

3. The combination of a filter tank, filter bags suspended in the tank, a slime tank, means connected with the filter bags for removing the metal solutions from the filter tank, said means comprising a suction pump, an air chamber, means for siphoning the metal solutions from the air chamber to prevent their passage through the suction pump, and means for passing the slime solution from the slime tank into the filter tank, said means having a capacity greater than the capacity of the suction pump and the siphoning devices, and means for permitting an overflow of the surplus from the filter tank to the slime tank, substantially as described.

4. The combination of a filter tank, filter bags suspended in said tank, a slime tank, suction mechanism connected with the bags for removing the metal solution from the tank through the bags, whereby the exterior surfaces of the latter become coated with the solid portion of the slime solution, means for introducing wash water to the filter tank for the purpose of removing from the coating of the bags any remaining values, means to permit an over-flow from the filter tank to provide for the escape of the surplus of supply, means for draining the solution from the filter tank after the washing operation is completed, means for introducing fluid under pressure to the filter bags for the purpose of expelling the aforesaid coating, the bottom of the filter tank being provided with a door or gate for the escape of the solution after the washing operation, and means for passing the slime solution from the slime tank into the filter tank at a greater speed than it is passed to the slime tank, substantially as described.

In testimony whereof I affix my signature in presence of two witnesses.

ERNEST P. DARGIN.

Witnesses:
 DENA NELSON,
 OTTO E. HODDICK.